United States Patent Office 3,339,581
Patented Sept. 5, 1967

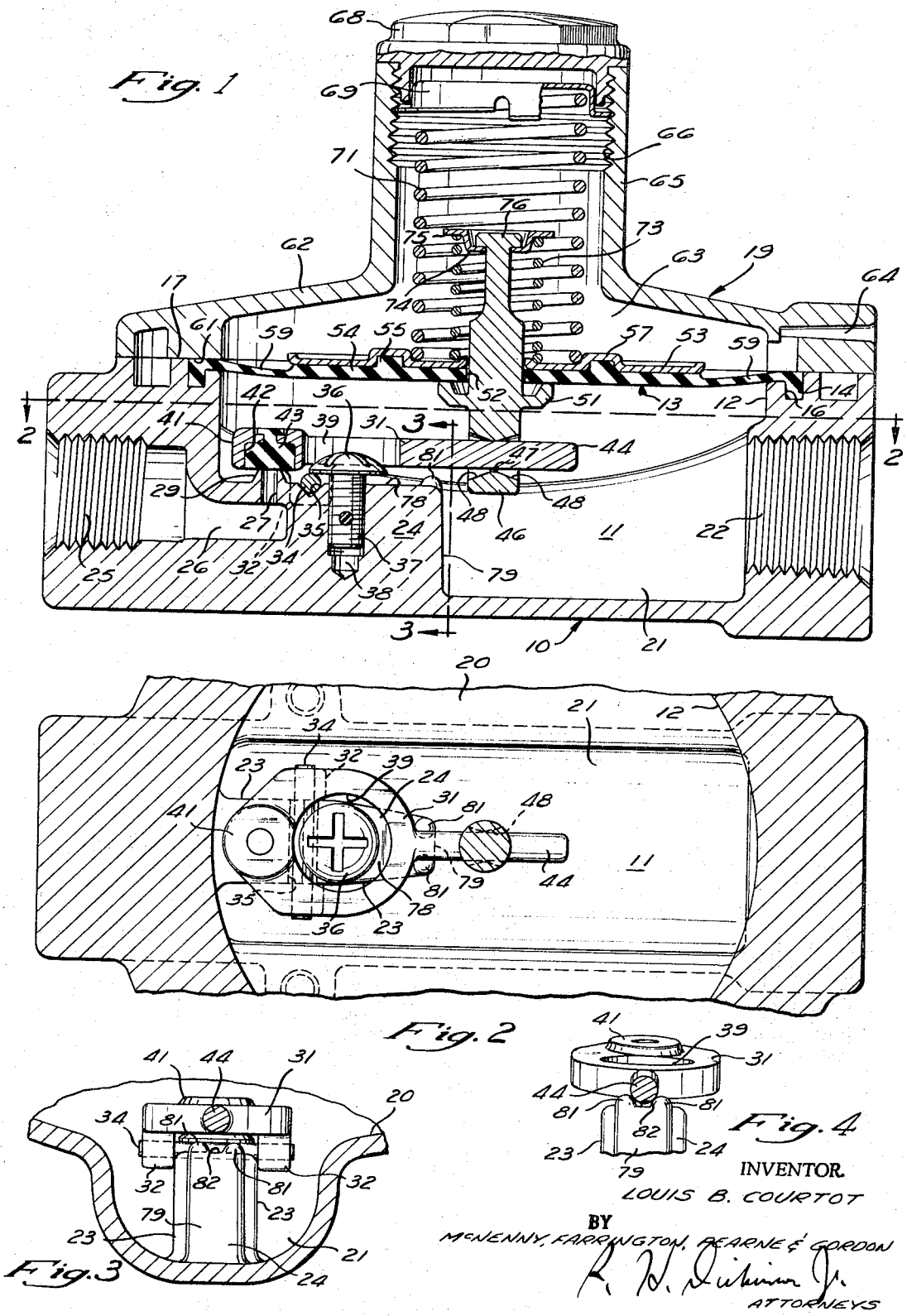

3,339,581
FLUID PRESSURE REGULATOR VALVE
Louis B. Courtot, Euclid, Ohio, assignor, by mesne assignments, to Textron Inc., Providence, R.I., a corporation of Rhode Island
Filed June 15, 1965, Ser. No. 464,038
7 Claims. (Cl. 137—505.46)

This invention relates generally to pressure regulating valves and more particularly to pressure regulating valves of the type used to maintain and regulate a low gas pressure at an outlet at varying rates of flow from a high pressure supply such as a tank of compressed gas.

Pressure regulating valves of this type are interposed between a tank of compressed gas and a device employing such gas both to reduce the pressure of the gas in the tank and to maintain a stable relatively low outlet pressure over a wide variety of rates of flow. Such valves use a diaphragm in the outlet chamber which is spring loaded so as to move in response to the outlet pressure to be regulated. This diaphragm is then utilized to actuate a valve controlling the flow of fluid from the inlet to the outlet chamber. Because such pressure regulating valves are expected to operate over a wide range of flow rates while maintaining a substantially constant outlet pressure, the valve mechanism must allow precise throttling of the inlet flow while having a relatively simple construction to insure reliability and low cost. Such mechanisms generally require a considerable amount of flexing movement of the diaphragm from zero flow to full flow. To insure long life for the pressure regulating valve, which are often used in conditions where they receive little service or attention, it is desirable to avoid any excessive stretching of the diaphragm. Therefore, when the diaphragm reaches the limit of its travel as in full flow conditions, it is particularly important that the diaphragm not be stretched unevenly. Since the diaphragm generally is supplied with a central stem for actuating the valve, it is important to prevent any tilting of this central stem as well as to provide a limit stop for the stem and diaphragm to prevent excessive stretching of the diaphragm.

It is important that pressure regulators have a simple construction which lends itself to low cost manufacture as well as a compact construction to provide a maximum rate of flow in a regulator of minimum size. Thus, it is necessary that the interior passages be streamlined to allow a high rate of flow with a minimum of turbulence which not only tends to restrict the maximum capacity, but also cause erratic action because of localized variations in pressure on the diaphragm.

Therefore, it is a principal object of this invention to provide a novel pressure regulator having improved means for guiding and positioning the diaphragm under full flow conditions.

It is a further object of this invention to provide a novel pressure regulator as set forth in the preceding object having improved flow characteristics and having a minimum amount of turbulence in the diaphragm chamber.

It is a further object of this invention to provide a flow regulator of the type having a valving member actuable by a lever which in turn is actuated by a diaphragm in which there is a stop to limit travel of the lever in the open position which is self-centering to positively stop and laterally position the lever so as to insure positive alignment in the open condition regardless of wear of the bearings on which the lever is pivoted.

It is a still further object of this invention to accomplish the foregoing objects in a pressure regulator which is simple in construction to allow low cost of manufacture yet retain high rate of flow and long cyclic life with a minimum of wear and a high degree of reliability.

Further objects and advantages of this invention will readily become apparent to those skilled in the art upon a more complete understanding of this invention, the preferred embodiment of which is described in the accompanying description and shown in the drawings in which:

FIGURE 1 is a vertical sectional view through a regulator according to the preferred embodiment of this invention;

FIGURE 2 is a fragmentary sectional view taken on line 2—2 of FIGURE 1;

FIGURE 3 is a fragmentary sectional view taken on line 3—3 of FIGURE 1; and

FIGURE 4 is a fragmentary elevational view, partly in section, of the lever and lever stop of FIGURE 3 with the lever in the full open position.

The present invention has been shown as incorporated in a modification of the fluid pressure regulator valve of Patent No. 3,056,424, issued Oct. 2, 1962, to Louis B. Courtot and George E. Tanker. This pressure regulator is of the type used in connection with liquefied petroleum gas systems and is connected to the supply tank to control the gas supply and reduce it from a high pressure to a regulated low pressure at the outlet. The regulator includes a body 10 defining therein a fluid chamber 11 which as shown in FIGURE 2 at its upper side has an annular wall 12. The upper side of the chamber 11 is closed off by means of a diaphragm 13 formed of molded elastomeric material and having a marginal lip 14 which fits within a groove 16 on the annular upper edge 17 of the wall 12 to hold the diaphragm in place. The diaphragm lip 14 is secured in the groove 16 by means of a closely fitting cover 19 which is secured to the body 10 over the diaphragm by suitable means such as screws (not shown).

The body 10 at the lower part of the fluid chamber 11 has a longitudinally extending channel portion 21 having a depth substantially greater than that of the outboard portion 20 which is generally hemispherical in shape. At the one end, the channel portion 21 is provided with a threaded outlet 22 to receive a suitable pipe fitting for connection to the downstream side of the system. At the other end of the channel portion 21 there is an upstanding boss 24 integral with the body 10 and of a width substantially less than that of the channel portion 21 so that its longitudinally extending sides 23 are spaced away from the walls of channel portion 21. The boss 24 extends to the side of the body opposite the outlet 22 where the body has a threaded inlet 25 adapted to receive a fitting connected to the high pressure supply. Inward of the threaded inlet 25 is a small inlet chamber 26 from which extends a vertical passage 27, at the upper end of which is a conical valve seat 29 within the fluid chamber 11.

In order to provide the sealing action at the valve seat 29, a lever 31 is provided at its mid portion with a pair of depending ears 32 which receive for pivotal mounting a pivot pin 34 which is non-rotatably clamped on top of the boss 24 in a transverse V-groove 35. The pivot pin 34 is held in place by the head 36 of a screw 37 which is threadedly engaged in a vertical bore 38 in the boss 24. The lever 31 at its mid portion between the depending ears 32 has an aperture 39 to allow access to the screw head 36.

The lever 31 has a head portion 41 overlying the valve seat 29, and the head 41 has a downwardly facing cavity 42 to receive a sealing member 43 of suitable resilient material such as rubber to make sealing contact against the valve seat 29. At the opposite end, the lever 31 has a cylindrical arm 44 extending longitudinally toward the center of the fluid chamber 11. It will be seen from this construction that as the lever 31 pivots on the pivot pin 34, the sealing member 43 is moved toward and away from the valve seat 29 so as to control the flow of fluid from the inlet chamber 26 into the fluid chamber 11.

To provide the necessary connection between the diaphragm 13 and the lever 31, a vertically extending stem 46 has a lower end adapted to receive the cylindrical arm 44 of lever 31. This is accomplished by means of a transverse opening 47 formed by inwardly converging conical surfaces 48 which receive the cylindrical arm 44 so as to freely allow relative movement along the lever due to the angunlar movement of the lever 31, while effectively limiting any lost motion along the axis of the stem to a minimum. The stem 46 extends upward and has a cup-shaped flange 51 adapted to make sealing contact on the underside of the diaphragm 13. The stem 46 extends further upward through a suitable enlarged aperture 52 in the diaphragm which is made larger than the stem as explained in greater detail hereinafter.

A rigid circular reinforcing disc 53 is located on the top side of the diaphragm 13 to overlie the center portion 54 of the diaphragm. The center portion 54 is provided with an upwardly projecting integral annular rib 55 on its upper surface which fits within a similarly shaped annular channel 57 on the reinforcing disc 53. This annular channel 57 not only serves as a spring seat, but also by receiving the annular rib 55 insures that the reinforcing disc will remain in surface abutting contact with the center portion 54 of the diaphragm as it flexes and moves up and down. To insure the flexing of the diaphragm takes place only in the outer zone, the annular portion 59 of the diaphragm outward of the center portion 54 is of reduced thickness so that substantially all flexing of the diaphragm will take place at the annular portion 59.

The cover 19 has a downwardly facing annular side 61 which clamps the diaphragm 13 in place against the upper side 17 of the body. Inward from the annular side 61, the cover 19 has a dome portion 62 defining an upper chamber 63 above the diaphragm 13 between the diaphragm and the cover. The cover 19 also has an upstanding centrally located tubular portion 65 having a vertically extending threaded bore 66 therein. A suitable sealing cap 68 is fitted on the upper end of the tubular portion 65 and is held in place by threaded engagement with the bore 66. Within the bore 66 and below cap 68 is located a suitable spring abutment 69 which may be formed of sheet metal and is threadedly engaged in the bore 66 to adjustably position one end of the control spring 71 which it received therein to thereby control the force that the spring 71 exerts on the diaphragm 13. At its lower end, the control spring 71 is adapted to fit within the annular channel 57 on reinforcing disc 53 to insure that the control spring 71 will be positively guided to prevent any cocking which would produce an unbalanced force on the diaphragm.

Within the control spring 71 is located a smaller helical relief spring 73 which extends around the output side of the stem 46. The relief spring 73 abuts at its lower end on the upper surface of the reinforcing disc 53 and at its upper end against a flange 75 on a spring retainer 74 which is adapted to fit beneath the head 76 on stem 46. The purpose of the relief spring 73 is to provide an upward bias on the stem 46 relative to the diaphragm 13 so as to maintain the flange 51 in sealing contact against the lower surface of the diaphragm 13. Thus, the stem 46 and flange 51 act as a relief valve in the event of excessive pressure within the chamber 11. In such case, since the diaphragm will be moved to an upward position and the lever 31 moved to close off the valve seat 29, a further increase in pressure in its lower chamber 11 would cause the diaphragm 13 to be lifted off the flange 51 so as to allow fluid pressure to escape through the aperture 52 into the upper chamber 63. From the upper chamber 63, such excess pressure would escape to the atmosphere through the vent 64 formed in cover 19.

The boss 24 is provided with a generally horizontal top surface 78 which extends beneath lever 31 inwardly toward the stem 46 and terminates a spaced distance therefrom in a vertical wall 79. On the top surface 78 adjacent vertical wall 79 are located a pair of generally hemispherical protrusions 81 spaced apart by a notch 82 equidistantly on each side of center line of the lever 31. These hemispherical protrusions 81 provide a positive stop for the lever 31 against further downward movement, and in addition provide positive lateral positioning for the cylindrical arm 44, as shown in greater detail in FIGURE 4. Under maximum flow conditions, the pressure in the fluid chamber 11 will be at a minimum so as to allow the diaphragm 13 and stem 46 to move downward to a bottom position. In such case, to insure long life for the diaphragm 13 it is necessary that this downward movement be limited so that the diaphragm is not stretched, and the extent of the thin annular portion 59 is generally such that at this bottom position no actual stretching of the diaphragm will take place providing the deflection is uniform at all points around the periphery of this annular portion. Thus, to prevent any cocking, it is necessary that the lower end of the stem 46 be positioned precisely along its vertical axis. Since tolerance and wear create a certain amount of free play at the mounting of the lever 31 on pivot pin 34, the cylindrical arm 44, being located at some distance from the pivot pin 34, will have a certain amount of free transverse movement which would tend to allow the stem 46 to become cocked and thus stretch the diaphragm at the outer edge. However, when the arm 44 moves downward, it will engage the hemispherical protrusions 81 which cause a centering action to insure that the cylindrical arm 44 will be centered against transverse or lateral movement as well as stopped against further downward movement. Because of this self-aligning feature, it is not necessary to provide any projecting positive stops within the fluid chamber 11 against which the diaphragm can rest to prevent cocking in this lower position. By the elimination of such stops, the interior surface of the fluid chamber 11 and the channel portion 21 may be made smooth and unbroken to allow maximum flow through the fluid chamber 11 with a minimum of turbulence caused by such projections. Thus, for a given size regulator the flow capacity is at a maximum without any sacrifice of the necessary guidance features for maintaining the alignment of the stem 46 to prevent any localized stretching of the diaphragm.

Although the preferred embodiment of the invention has been shown and described in detail, it is recognized that various modifications and rearrangements thereof may readily occur to those skilled in the art upon a full understanding of this invention, and such modifications and rearrangements may be resorted to without departing from the scope of the invention as defined in the claims.

What is claimed is:

1. A fluid pressure regulator comprising a body defining a fluid chamber having an open side, a diaphragm closing said open side and movable responsive to the fluid pressure in said chamber, spring means biasing said diaphragm into said chamber, an outlet from said chamber, an inlet on said body, passage means interconnecting said inlet and said chamber and including a valve seat, a lever pivotally mounted in said chamber, a valve closure member movable to and from said valve seat by said lever, linkage means interconnecting said lever and said diaphragm, and stop means engageable by said lever when said valve closure member is away from said valve seat, said stop means being operable when engaged by said lever to positively restrain said lever against lateral movement and pivotal movement in one direction.

2. A fluid pressure regulator comprising a body defining a fluid chamber having an open side, a diaphragm closing said open side and movable responsive to the fluid pressure in said chamber, spring means biasing said diaphragm into said chamber, an outlet from said chamber, an inlet on said body, passage means interconnecting said inlet and said chamber and including a valve seat, a lever pivotally mounted in said chamber, a valve closure member movable to and from said valve seat by said lever, linkage means interconnecting said lever and said diaphragm, and stop means on said body adjacent said linkage means engageable by said lever when said valve closure member is away from said valve seat, said stop means being operable when engaged by said lever to positively restrain said lever against lateral movement and pivotal movement in one direction.

3. A fluid pressure regulator comprising a body defining a fluid chamber having an open side, a diaphragm closing said open side and movable responsive to the fluid pressure in said chamber, spring means biasing said diaphragm into said chamber, an outlet from said chamber, an inlet on said body, a passage interconnecting said inlet and said chamber, a valve seat on said body around the end of said passage adjacent said chamber, a lever pivotally mounted intermediate its ends on said body in said chamber, a valve closure member mounted on one end of said lever adjacent said valve seat whereby movement of said lever in one direction moves said valve closure member away from said valve seat, linkage means interconnecting the other end of said lever and said diaphragm, and stop means engageable by the other end of said lever when said valve closure member is away from said valve seat, said stop means being operable when engaged by said other end of said lever to positively restrain said lever against lateral movement and further pivotal movement in said one direction.

4. A fluid pressure regulator comprising a body defining a fluid chamber having an open side, a diaphragm closing said open side and movable responsive to the fluid pressure in said chamber, spring means biasing said diaphragm into said chamber, an outlet from said chamber, an inlet on said body, a passage interconnecting said inlet and said chamber, a valve seat on said body around the end of said passage adjacent said chamber, a lever pivotally mounted intermediate its ends on said body in said chamber, a valve closure member mounted on one end of said lever adjacent said valve seat whereby movement of said lever in one direction moves said valve closure member away from said valve seat, linkage means interconnecting the other end of said lever and said diaphragm, and a pair of laterally spaced protrusions on said body in said chamber defining therebetween a notch engageable by said other end of said lever when said valve closure member is away from said valve seat to positively restrain said lever against lateral movement and further pivotal movement in said one direction.

5. A fluid pressure regulator comprising a body defining a fluid chamber having an open side, a diaphragm closing said open side and movable responsive to the fluid pressure in said chamber, spring means biasing said diaphragm into said chamber, an outlet from said chamber, an inlet on said body, an integral projecting bore on said body in said chamber adjacent said inlet, a passage in said bore normal to said diaphragm interconnecting said inlet and said chamber, a valve seat on said boss around the end of said passage adjacent said chamber, a lever pivotally mounted intermediate its ends on said boss to extend substantially parallel to said diaphragm, a valve closure member mounted on the end of said lever adjacent said valve seat whereby movement of said lever in one direction moves said valve closure member away from said valve seat, linkage means interconnecting the other end of said lever and said diaphragm, and stop means engageable by the other end of said lever when said valve closure member is away from said valve seat, said stop means being operable when engaged by said other end of said lever to positively restrain said lever against lateral movement and further pivotal movement in said one direction.

6. A fluid pressure regulator comprising a body defining a fluid chamber having an open side, a diaphragm closing said open side and movable responsive to the fluid pressure in said chamber, spring means biasing said diaphragm into said chamber, an outlet from said chamber, an inlet on said body, an integral projecting boss on said body in said chamber adjacent said inlet, a passage in said boss normal to said diaphragm interconnecting said inlet and said chamber, a valve seat formed on said boss around the end of said passage adjacent said chamber, a lever pivotally mounted intermediate its ends on said boss to extend substantially parallel to said diaphragm, a valve closure member mounted on the end of said lever adjacent said valve seat whereby movement of said lever in one direction moves said valve closure member away from said valve seat, linkage means interconnecting the other end of said lever and said diaphragm, and a pair of laterally spaced protrusions on said boss defining therebetween a notch engageable by said other end of said lever when said valve closure member is away from said valve seat to positively restrain said lever against lateral movement and further pivotal movement in said one direction.

7. A fluid pressure regulator comprising a body defining a fluid chamber having an open side, a diaphragm closing said open side and movable responsive to the fluid pressure in said chamber, spring means biasing said diaphragm into said chamber, an outlet from said chamber, an inlet on said body, an integral projecting boss on said body in said chamber adjacent said inlet, a passage in said boss normal to said diaphragm interconnecting said inlet and said chamber, a valve seat formed on said boss around the end of said passage adjacent said chamber, a lever pivotally mounted intermediate its ends on said boss to extend substantially parallel to said diaphragm, a valve closure member mounted on the end of said lever adjacent said valve seat whereby movement of said lever in one direction moves said valve closure member away from said valve seat, the other end of said lever being cylindrical and extending beyond said boss, linkage means interconnecting said other end of said lever and said diaphragm, and a pair of hemispherical laterally spaced protrusions on said boss defining therebetween a notch engageable by said cylindrical other end of said lever when said valve closure member is away from said valve seat to positively restrain said lever against lateral movement and further pivotal movement in said one direction.

No references cited.

WILLIAM F. O'DEA, *Primary Examiner.*

H. W. WEAKLEY, *Assistant Examiner.*